Jan. 15, 1924. 1,480,822
A. HUBALEK
AUTOMOBILE BRAKE
Filed March 19, 1923 2 Sheets-Sheet 1
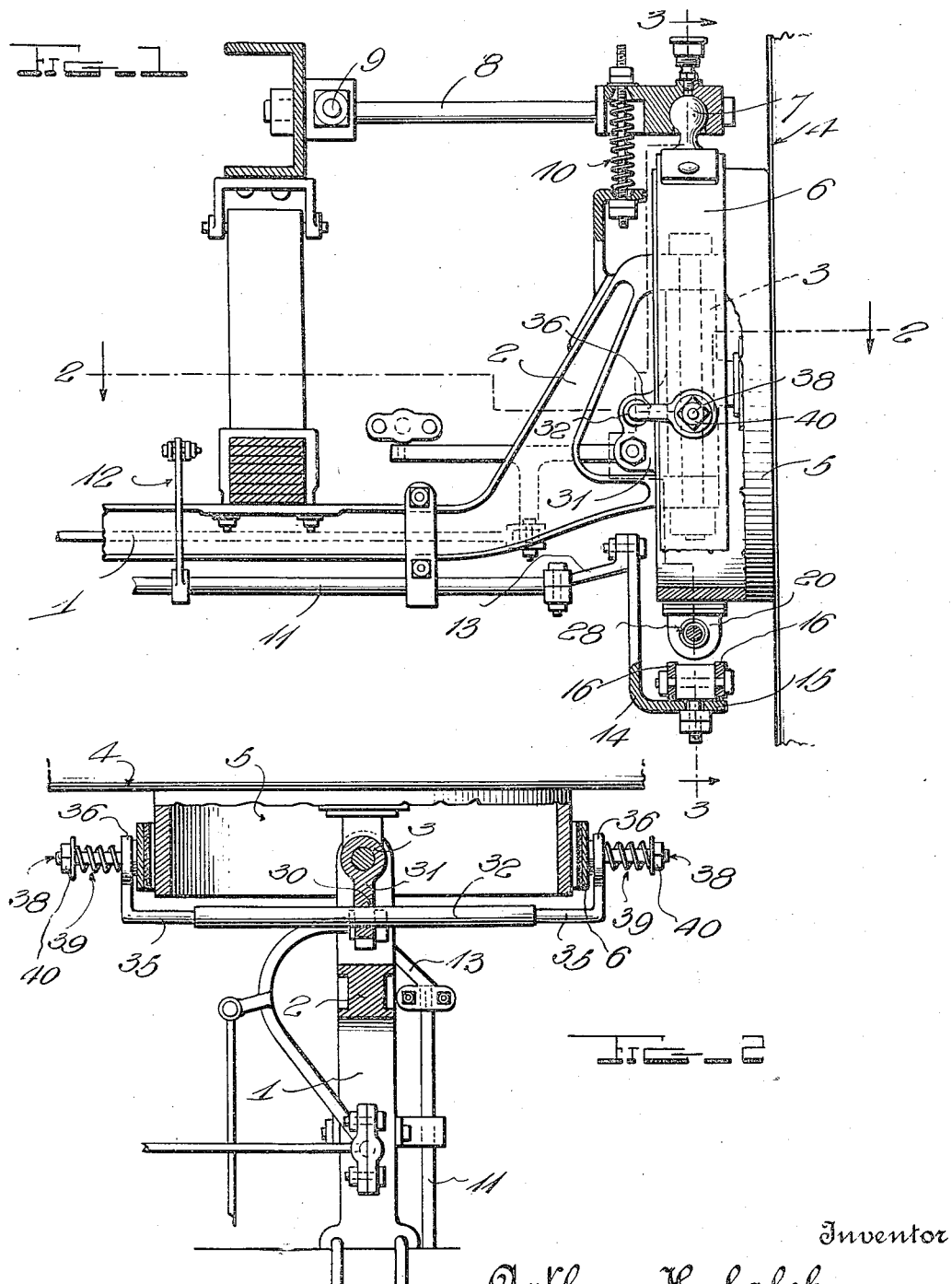
Witness
Inventor
Arthur Hubalek
By H. R. Wilson & co.
Attorneys

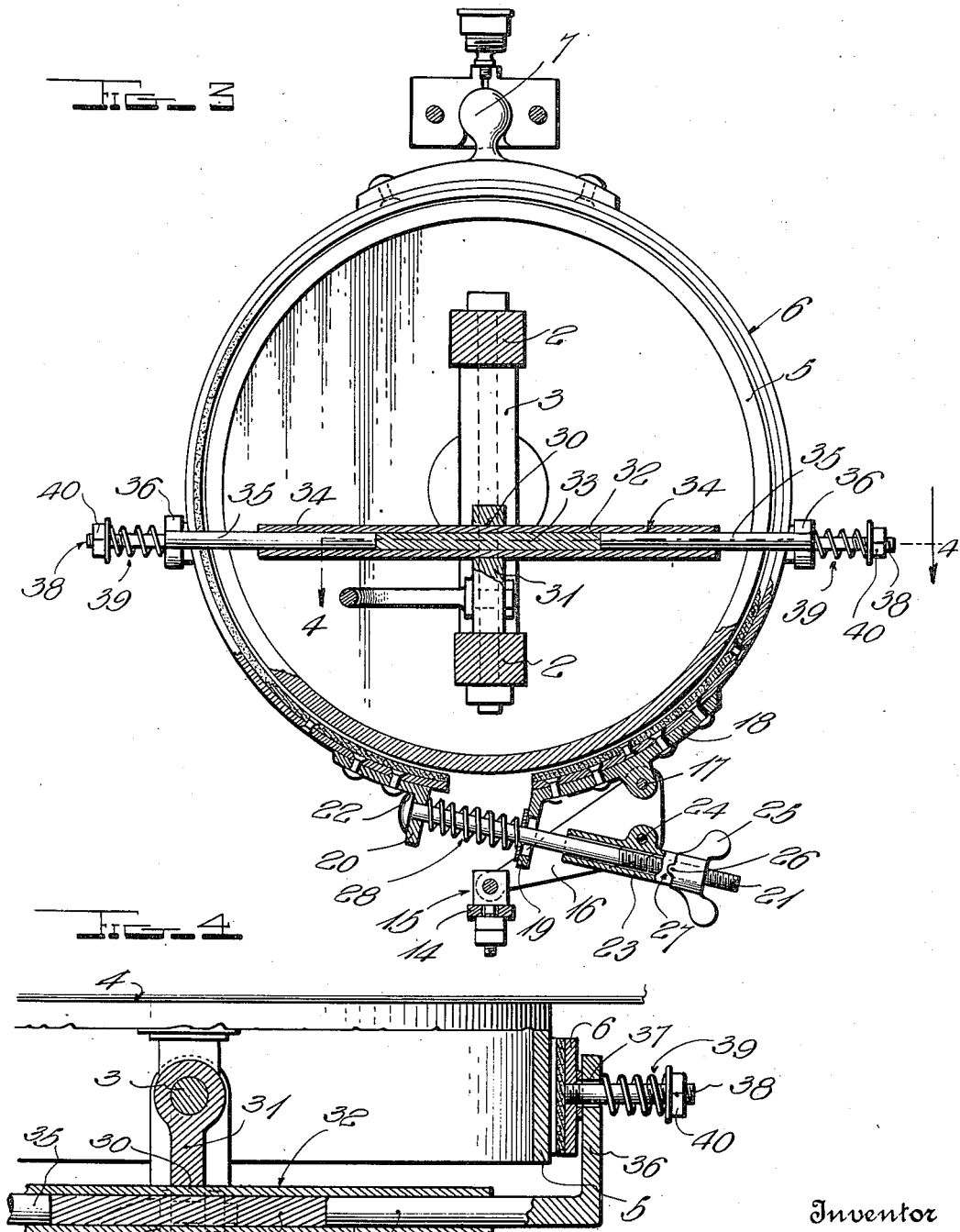

Patented Jan. 15, 1924.

UNITED STATES PATENT OFFICE.

ARTHUR HUBALEK, OF BROOKLYN, NEW YORK.

AUTOMOBILE BRAKE.

Application filed March 19, 1923. Serial No. 626,035.

*To all whom it may concern:*

Be it known that I, ARTHUR HUBALEK, a citizen of the United States, residing at Brooklyn, in the county of Kings and State of New York, have invented certain new and useful Improvements in Automobile Brakes; and I do declare the following to be a full, clear, and exact description of the invention, such as will enable others skilled in the art to which it appertains to make and use the same.

My invention relates to improvements in automobile brakes of the type associated with the front wheels of the machine, such a brake structure being shown by my pending application, Serial No. 585,678, which has matured into a Patent Number 1,467,854, September 11, 1923.

It is the object of the present invention to improve upon the construction shown by the above named pending application, the improvement residing in novel means for assisting in supporting the brake band and for normally expanding said band so that it does not contact with the drum.

With the foregoing in view, the invention resides in the novel subject matter hereinafter described and claimed, the description being supplemented by the accompanying drawings.

Figure 1 is a front elevation partly in vertical section of a portion of an automobile equipped with a front brake including the present invention.

Figure 2 is a horizontal sectional view as indicated by line 2—2 of Fig. 1.

Figure 3 is a vertical transverse sectional view on line 3—3 of Fig. 1.

Figure 4 is an enlarged horizontal sectional view on line 4—4 on Fig. 3.

In the drawings above briefly described, the numeral 1 designates an automobile axle having the usual forked end 2 in which the steering knuckle 3 carrying one of the front wheels 4, is pivotally mounted, the usual steering mechanism being connected with said knuckle. On the inner side of the wheel 4, is a brake drum 5 surrounded by a brake band 6, this brake band being connected by a ball and socket joint 7 to a radius rod 8 pivoted at 9 to the frame of the machine. The outer end of the rod 8 and consequently the weight of the brake band 6 are supported by a suitable spring device 10 so that said band will not normally ride upon the brake drum 5.

Suitably mounted on the axle 1, is a rock shaft 11 having a crank arm 12 to be connected with suitable brake operating means, the end of said shaft being provided with an additional crank arm 13 connected by a link 14 and a suitable coupling 15, with a pair of parallel levers 16 which are used for contracting the brake band. Practically the same construction as that so far described, is shown in the pending application above referred to, and consequently no claim is made thereto in the present application. There is a slight change however, made in the connecting means between the levers 16 and the brake band 6, in order that adjustment may be more easily made to compensate for wear.

The levers 16 are fulcrumed at 17 to a reinforcement 18 on one end of the brake band 6, said reinforcement having a slotted outwardly extending ear 19 opposed to a similar ear 20 on the other end of the brake band. A bolt 21 passes through the two ears and preferably has its head flattened as indicated at 22 to hold said bolt against rotation. The end of the bolt 21 opposite its head, is threaded and passes slidably through a sleeve 23 which at 24 is pivoted between the levers 16, a thumb nut 25 being threaded upon said bolt end in contact with the outer end of the sleeve, whereby the band 6 may be contracted at will to take up wear. The nut 25 is provided with a rounded projection 26 receivable in a recess 27 in the outer end of the sleeve 23, whereby to normally hold said nut against rotation. The ends of the band 6 are normally separated by a coiled spring 28 surrounding the bolt 21 and this spring serves to yieldably retain the projection 26 within the recess 27.

Whenever the link 14 is forced downwardly by the crank arm 13, the levers 16 rock around their fulcrum 17, thereby pulling upon the sleeve 23 and the bolt 21 to contract the brake band 6 around the drum 5. As soon as these parts are released however, spring 28 expands the band so that the drum will run freely therein.

Secured in any desired manner to the steering knuckle 3, for instance by securing it in an opening 30 in a web 31 on said steering knuckle, is a horizontal tube 32 which is parallel with the plane of rotation of the drum 5. A filler rod 33 is secured in the intermediate portion of the tube 32 and the ends of said tube, beyond the filler rod 33, constitute sockets 34 which receive a pair of relatively short rods 35, the outer ends of the rods being laterally directed as indicated at 36 and formed with openings 37. These openings loosely receive studs 38 which extend outwardly from the brake band 6, coiled springs 39 being interposed between the lateral rod ends 36 and nuts 40 on said studs 38.

The springs 39 press outwardly upon the nuts 40 and studs 38 and thus hold the band 6 against dragging on the brake drum 5 and it will be seen that said springs react against the rods 35 and hold them in tight contact with the ends of the filler rod 33. Thus, the rods 35 do not have to slide longitudinally in order that the springs may expand the brake band, this being advantageous over the construction shown in the pending application, in which relative movement was necessary under spring action, between the three parts corresponding to the parts 32 and 35 of the present application. When such relative movement is necessary and the springs are housed as in the pending application, it is difficult to obtain springs of sufficient reliability to operate effectively under all conditions, particularly when the entire brake mechanism becomes splashed with mud or the like.

From the foregoing, taken in connection with the accompanying drawings, my improvements will be readily understood and it will be seen that they are advantageous over the construction shown by the application above referred to. As excellent results may be obtained from the details disclosed, these details may well be followed, but within the scope of the invention as claimed, numerous minor changes may be made.

I claim:

1. An automobile brake comprising a drum for attachment to a front wheel, a brake band surrounding said drum, and a carrier for said brake band comprising a horizontal member to be rigidly secured between its ends to a steering knuckle of the machine, the ends of said member having elongated sockets, a pair of rods received in and extending from said sockets, the projecting ends of said rods having lateral arms at the outer side of said brake band, and yielding connections between said arms and said band.

2. An automobile brake comprising a drum for attachment to a front wheel, a brake band surrounding said drum, and a carrier for said brake band comprising a horizontal member to be rigidly secured between its ends to a steering knuckle of the machine, the ends of said member having elongated sockets, a pair of rods received in and extending from said sockets, the projecting ends of said rods having lateral arms at the outer side of said brake band formed with openings, rigid studs extending from said brake band and slidable in said openings, coiled springs surrounding said studs and bearing against the outer sides of said arms, and shoulders on the outer ends of said studs against which said springs thrust.

3. An automobile brake comprising a drum for attachment to a front wheel, a brake band surrounding said drum, and a carrier for said brake band comprising a horizontal tube to be rigidly secured between its ends to a steering knuckle of the machine, a filler rod in the intermediate portion of said tube, a pair of rods received in and projecting from the ends of said tube with their inner ends contacting with the ends of said filler rod, the outer ends of said pair of rods having laterally directed ends at the outer side of said brake band, and spring connections between said lateral rod ends and said band, said spring devices acting to move the pair of rods inwardly and the brake band outwardly.

In testimony whereof I have hereunto affixed my signature.

ARTHUR HUBALEK.